(12) United States Patent
Takeda (10) Patent No.: US 9,796,535 B2
(45) Date of Patent: Oct. 24, 2017

(54) PREFORM ALIGNMENT APPARATUS

(71) Applicant: NISSEI ASB MACHINE CO., LTD., Nagano (JP)

(72) Inventor: Shinya Takeda, Nagano (JP)

(73) Assignee: NISSEI ASB MACHINE CO., LTD, Nagano (JP)

( * ) Notice: Subject to any disclaimer, the term of this patent is extended or adjusted under 35 U.S.C. 154(b) by 0 days.

(21) Appl. No.: 15/118,741

(22) PCT Filed: Feb. 10, 2015

(86) PCT No.: PCT/JP2015/053686
§ 371 (c)(1),
(2) Date: Aug. 12, 2016

(87) PCT Pub. No.: WO2015/122412
PCT Pub. Date: Aug. 20, 2015

(65) Prior Publication Data
US 2017/0121121 A1    May 4, 2017

(30) Foreign Application Priority Data
Feb. 13, 2014  (JP) ................. 2014-025789

(51) Int. Cl.
*B65G 47/24*  (2006.01)
*B65G 17/32*  (2006.01)
(Continued)

(52) U.S. Cl.
CPC .......... *B65G 43/08* (2013.01); *B29C 49/4205* (2013.01); *B29C 49/78* (2013.01);
(Continued)

(58) Field of Classification Search
CPC ................ B65G 47/24; B65G 47/1471; B65G 47/1428; B65G 47/1435; B65G 47/1457; B65G 47/1407
(Continued)

(56) References Cited

U.S. PATENT DOCUMENTS 3,599,829 A * 8/1971 Aidlin ................ B65G 47/1428
198/380
3,707,217 A * 12/1972 Sharbon ............. B65G 47/1457
198/380
(Continued)

FOREIGN PATENT DOCUMENTS

JP  04371415  12/1992
JP  09071314  3/1997
(Continued)

*Primary Examiner* — James R Bidwell
(74) *Attorney, Agent, or Firm* — David L. Hoffman; HOFFMAN PATENT GROUP (57) ABSTRACT

A rotating disk-type preform alignment apparatus 1 including a disk 10, which is rotationally driven about a rotation axis tilted from a vertical direction, and a partition wall 28 erected outwardly of the disk, the apparatus being adapted to align preforms 100, which have been supplied onto the disk, at the peripheral edge of the disk and discharge the aligned preforms from a discharge section, the apparatus comprising: pockets 30 arranged side by side in a circumferential direction at the peripheral edge of the disk, each pocket having an opening portion into which the preform is dropped, and each pocket having a holding portion provided on the inner peripheral surface of the opening portion for holding the preform in an upright state; and a gas jetting unit 40, provided outwardly of the disk between a region where the preforms are supplied onto the disk and the discharge section, for jetting a gas from outside the pocket and from below the pocket, wherein the inner peripheral surface of the
(Continued)

opening portion of the pocket has a tapered shape imitating the trunk shape of the preform.

16 Claims, 8 Drawing Sheets

(51) Int. Cl.
  *B65G 43/08* (2006.01)
  *B65G 47/52* (2006.01)
  *B65G 47/84* (2006.01)
  *B29C 49/42* (2006.01)
  *B29C 49/78* (2006.01)
  *B29L 31/00* (2006.01)
  *B29K 105/00* (2006.01)
(52) U.S. Cl.
  CPC ........ *B65G 47/525* (2013.01); *B65G 47/846* (2013.01); *B29C 2949/78218* (2013.01); *B29K 2105/253* (2013.01); *B29L 2031/716* (2013.01)
(58) Field of Classification Search
  USPC .............. 198/397.01, 397.02, 393, 396, 392
  See application file for complete search history.

(56) References Cited

U.S. PATENT DOCUMENTS

| | | | | |
|---|---|---|---|---|
| 4,104,966 A | * | 8/1978 | Ackley, Jr. | B41F 17/36 198/393 |
| 5,191,961 A | * | 3/1993 | Wilson | B65G 47/1457 198/380 |
| 5,800,118 A | * | 9/1998 | Kurome | B65G 51/03 198/397.01 |
| 5,853,077 A | * | 12/1998 | Schmitt | B65B 35/10 198/383 |
| 5,984,079 A | * | 11/1999 | Garcia | G01R 31/013 198/392 |
| 7,258,222 B2 | * | 8/2007 | Marti Sala | B65G 47/1464 198/393 |
| 8,033,077 B2 | * | 10/2011 | Svendsen | A63B 5/10 403/374.4 |
| 8,640,852 B2 | * | 2/2014 | Seki | B07C 5/34 198/380 |
| 8,733,535 B2 | * | 5/2014 | Garcia | G01R 31/2893 198/396 |
| 8,978,869 B2 | * | 3/2015 | Schombert | B65G 47/1464 198/392 |

FOREIGN PATENT DOCUMENTS

| | | |
|---|---|---|
| JP | 09085811 | 3/1997 |
| JP | 10087053 | 4/1998 |
| JP | 2004082404 | 3/2004 |
| JP | 09085811 | 9/2004 |
| JP | 2007516115 A | 6/2007 |
| JP | 2010503589 A | 2/2010 |
| WO | WO2005061352 A | 7/2005 |
| WO | WO2007116155 A | 10/2007 |

* cited by examiner

PREFORM ALIGNMENT APPARATUS

This application is a U.S. national stage application of International Patent Application No. PCT/JP2015/053686, having an international filing date of Feb. 10, 2015, which designated the United States and which claims priority from Japanese Patent Application No. 2014-025789, filed on Feb. 13, 2014, the entirety of both of which are incorporated herein by reference.

TECHNICAL FIELD

This invention relates to a preform alignment apparatus and, specifically, relates to a preform alignment apparatus which can align preforms having a large mouth diameter and a relatively heavy weight and transport them to a blow molding machine.

BACKGROUND ART

Containers using resin materials such as polyethylene terephthalate (PET) have found a wider variety of uses, and those of a wide-mouthed type have been available for food preservation. Preforms for such a type of container are markedly insufficient in alignment properties in comparison with preforms for beverage bottles. Causes for this marked insufficiency include, for example, neck shapes so diverse as to have no diameter of curvature in an inwardly convex section of a trunk below a support ring; shapes of very small dimensions; and large mouth diameters and shapes at diameter/overall height≈1, so that the center of gravity is close to the middle. Because of the relatively heavy weight, moreover, surface flaws are apt to occur.

With a blow molding machine adopting a 2-stage process, the above-mentioned preforms need to be aligned and fed.

Among alignment apparatuses for such purposes are roller type aligning machines, vibration bowl type aligning machines, and rotating disk type aligning machines. The roller type aligning machine, however, cannot sufficiently deal with diverse wide-mouthed preforms. Concretely, narrow-mouthed preforms for beverage containers have a neck shape (support ring) standardized, and their trunk shape is slender and easily supportable in a single direction (vertical direction) on aligning rollers. Wide-mouthed preforms for food preservation, by contrast, have a neck shape ranging in many types and wide varieties, without being standardized. Their support rings are often small compared with the diameter of the preform. Furthermore, the trunk is nearly bowl-shaped, and its center of gravity is located near the center of the preform. Thus, the preforms are difficult to support on the aligning rollers in a single direction. Besides, the vibration bowl type aligning machine poses the problems that it is relatively low in the capacity to align and supply preforms and is apt to cause surface flaws. On the other hand, the rotating disk type aligning machine is described, for example, in Patent Document 1.

PRIOR ART DOCUMENTS

Patent Documents

Patent Document 1: Japanese Patent No. 3599851

SUMMARY OF THE INVENTION

Problems to be solved by the invention

With the apparatus of Patent Document 1, which lays preforms down in a groove and aligns them there, preforms for beverage bottles have been aligned successfully. However, wide-mouthed preforms of various shapes have not been stable in a laid-down state, and their alignment has been difficult.

The present invention has been accomplished in light of the above circumstances. It is an object of the invention to provide a preform alignment apparatus which can be adapted for aligning preforms of varieties of shapes and pose no problems with alignment and supply capability.

Means for solving the problems

A first aspect of the present invention for solving the above problems is a rotating disk-type preform alignment apparatus including a disk, which is rotationally driven about a rotation axis tilted from a vertical direction, and a partition wall erected outwardly of the disk, the apparatus being adapted to align preforms, which have been supplied onto the disk, at the peripheral edge of the disk and discharge the aligned preforms from a discharge section, the apparatus comprising: pockets arranged side by side in a circumferential direction at the peripheral edge of the disk, each pocket having an opening portion into which the preform is dropped, and each pocket having a holding portion provided on the inner peripheral surface of the opening portion for holding the preform in an upright state; and a gas jetting unit, provided outwardly of the disk between a region where the preforms are supplied onto the disk and the discharge section, for jetting a gas from outside the pocket and from below the pocket, wherein the inner peripheral surface of the opening portion of the pocket has a tapered shape imitating the trunk shape of the preform.

A second aspect of the present invention is the preform alignment apparatus according to the first aspect, wherein the gas jetting unit includes a sensor for detecting the preform stuck in the pocket without being in a predetermined state, and the gas is jetted upon detection by the sensor.

A third aspect of the present invention is the preform alignment apparatus according to the first or second aspect, wherein the disk includes in a center thereof a second disk which is concentric with the disk and which is driven in an opposite direction.

A fourth aspect of the present invention is the preform alignment apparatus according to any one of the first to third aspects, wherein the pockets are each formed by an attaching/detaching member mounted detachably on the outer periphery of the disk, and the partition wall.

A fifth aspect of the present invention is the preform alignment apparatus according to any one of the first to fourth aspects, further comprising a supply device for supplying the preforms in a constant volume onto the disk.

A sixth aspect of the present invention is the preform alignment apparatus according to any one of the first to fifth aspects, further comprising a rotating member provided above the disk between the region where the preforms are supplied onto the disk and the discharge section, wherein the rotating member rotates below in the vertical direction from outside toward inside to rake out the preform stuck in the pocket without being in a predetermined state.

Effects of the Invention

According to the present invention, there is provided the preform alignment apparatus equipped with the pockets, each pocket having the opening portion into which the preform is dropped, and each pocket having the holding portion provided on the inner peripheral surface of the opening portion for holding the preform in the upright state; the gas jetting unit for jetting the gas from outside the pocket and from below the pocket; and the rotating member rotating below in the vertical direction from outside toward inside to rake out the preform stuck in the pocket without being in the predetermined state. In this configuration, only the preforms held in the pockets in a normal posture can be discharged efficiently. Consequently, the preform alignment apparatus can accommodate the alignment of variously shaped preforms, without posing problems with alignment and supply capabilities.

BRIEF DESCRIPTION OF THE DRAWINGS

FIGS. 7 (a) to 7(c) are views schematically showing the configuration of a gas jetting unit according to the embodiment of the present invention.

MODE FOR CARRYING OUT THE INVENTION

Figure 1:
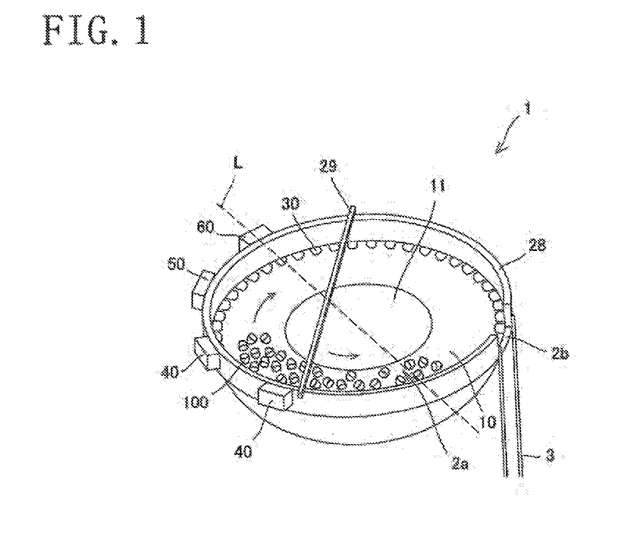
FIG. 1 is a perspective view of essential parts of a preform alignment apparatus according to an embodiment of the present invention.
Figure 2:
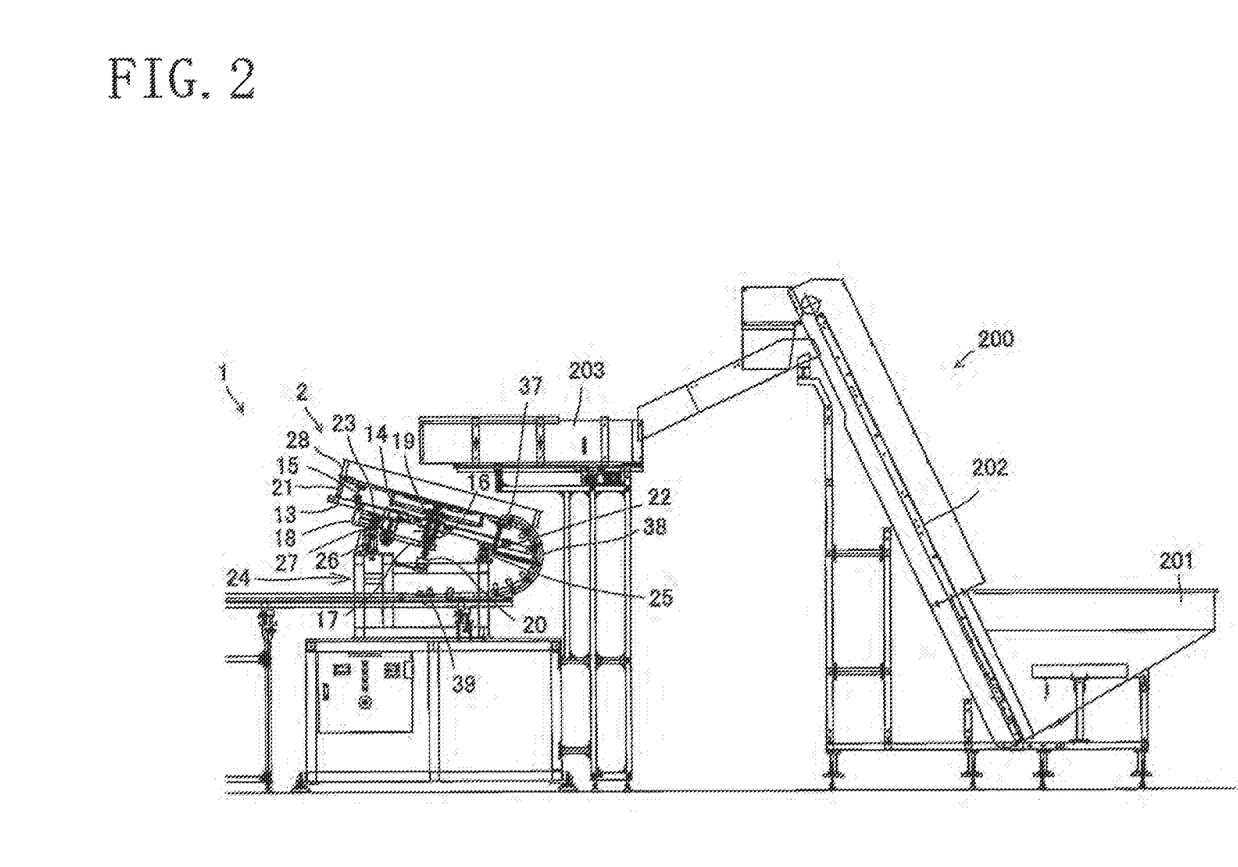
FIG. 2 is a side view of the preform alignment apparatus according to the embodiment of the present invention.
Figure 3:
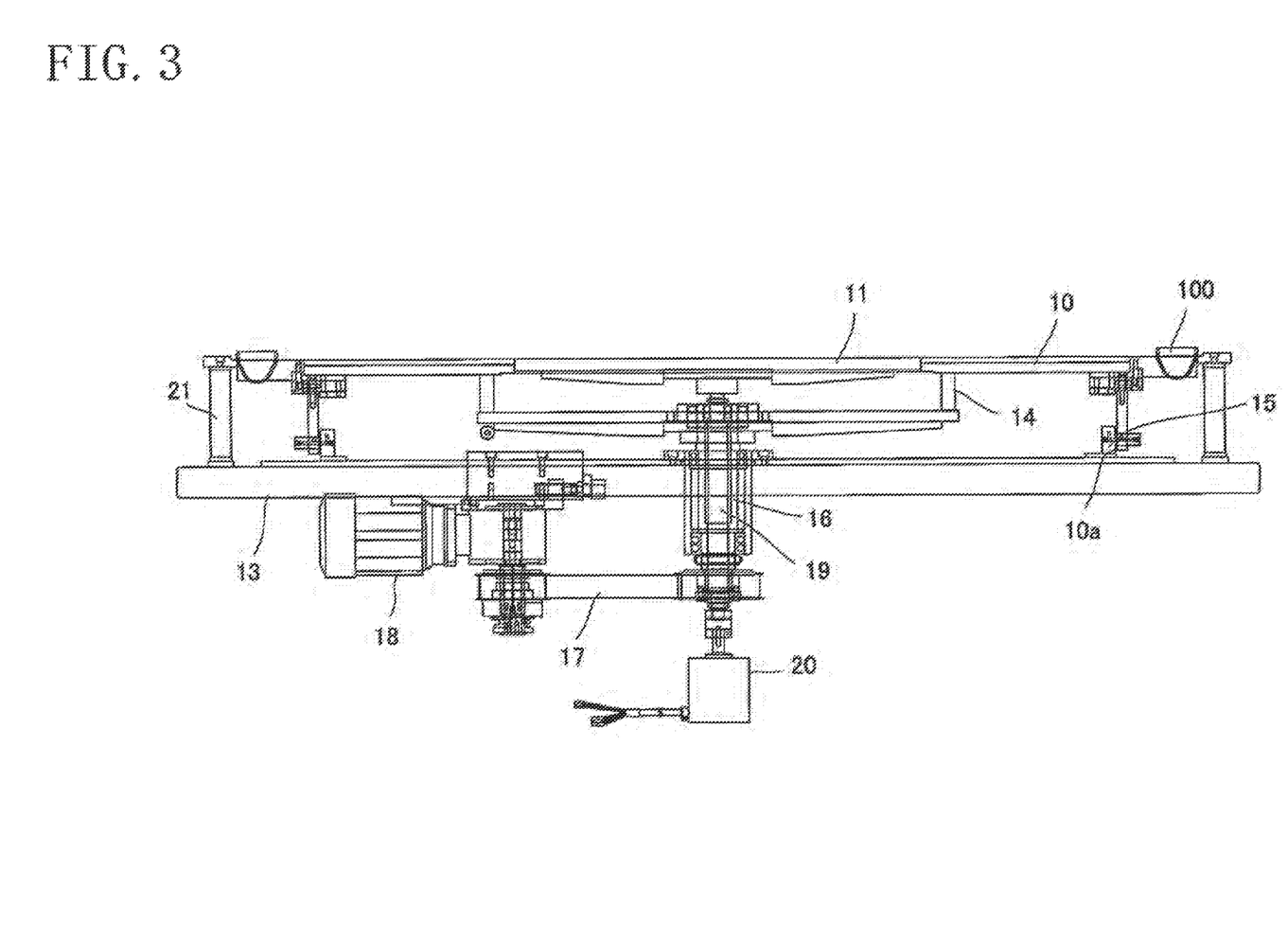
FIG. 3 is a sectional view of the essential parts of the preform alignment apparatus according to the embodiment of the present invention.

An embodiment of the present invention will be described in detail by reference to the accompanying drawings. FIG. 1 is a perspective view of essential parts of a preform alignment apparatus, FIG. 2 is a side view of the preform alignment apparatus, and FIG. 3 is a sectional view of the essential parts of the preform alignment apparatus.

As shown in the drawings, a preform alignment apparatus 1 comprises a preform alignment section 2 for aligning, in particular, wide-mouthed preforms 100, and a preform discharge section 3 for supplying the aligned preforms 100 in an aligned state to a blow molding machine. To the preform alignment apparatus 1, a preform supply device 200 for supplying the preforms 100 from above to the preform alignment section 2 is annexed.

Figure 4A:
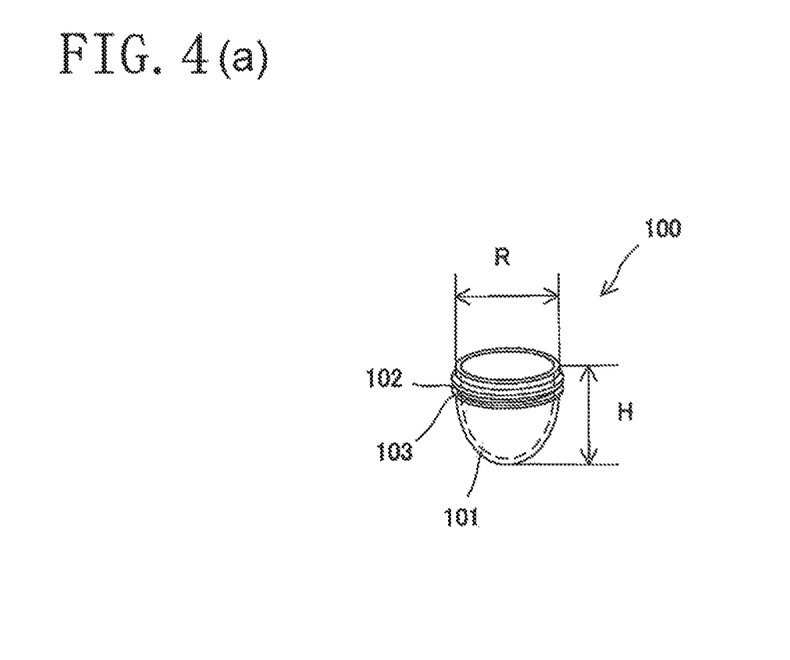
FIGS. 4(a), 4(b) are a perspective view and a sectional view, respectively, showing an example of a preform for use in the present invention.
Figure 4B:
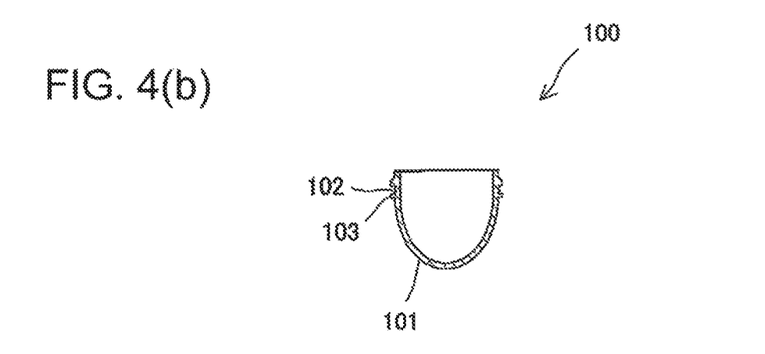

The wide-mouthed preform 100, an example of which is shown in FIGS. 4(a), 4(b), is used, for example, for food preservation, and comprises a preform body (trunk) 101, a neck (threaded part) 102, and a support ring (flange) 103 between them. Such a preform 100 has such a shape that the ratio of its diameter R to its overall height (height) H, R/H, is not limited, but is, for example, in the range of 1.2 or less, typically, R/H≈1.

The preform alignment section 2 of the preform alignment apparatus 1 for aligning such preforms 100 includes a disk 10 to be rotationally driven about a rotation axis tilted from a vertical direction. In FIG. 1, the preform alignment section 2 is inclined such that its lower right side is lower than its upper left side in the drawing along a line L. The upper left side of the line L in the drawing is the highest, while the lower right side of the line L in the drawing is the lowest. The preform 100 is supplied from the preform supply device 200 to a supply region 2a located at the right front in FIG. 1. On the other hand, a discharge region 2b, through which the preforms 100 aligned on the upper side of the disk 10 in FIG. 1 are discharged to the preform discharge section 3, is provided.

The disk 10 includes at its center a second disk 11 which is concentric with the disk and which is driven rotationally in an opposite direction. The disk 10 is rotationally driven clockwise, while the second disk 11 is rotationally driven counterclockwise, in FIG. 1. In detail, a disk rest 13 is provided below the disk 10 and the second disk 11, and a double drive shaft mechanism is rotatably supported at the center of the disk rest 13, as shown in FIG. 3. It is permissible to rotationally drive the disk 10 counterclockwise and the second disk 11 clockwise.

An inner edge part of the doughnut-shaped disk 10 is supported by drive arms 14, and an outer edge part thereof is pivotably supported by an annular support stand 15 provided on the disk rest 13. Concretely, a pivoting member 10a (cam follower- or roller-equipped) suspending from the lower surface of the outer edge part of the disk 10 is rollably placed on the annular support stand 15 (cam member) provided on the disk rest 13. The drive arms 14 are fixed to an outer drive shaft 16, and the outer drive shaft 16 is coupled to a drive shaft of a first drive motor 18 via a belt 17 so as to be rotationally driven.

The second disk 11 has a center supported by an inner drive shaft 19, and the inner drive shaft 19 is rotationally driven by a second drive motor 20.

The disk rest 13 has a toroidal outer wall 21 provided at its outer peripheral edge, and is supported by a support base 24 via a first support 22 and a second support 23 provided on the lower surface thereof at positions along the line L. The first support 22 is pivotably coupled to a bearer 25 provided on the support base 24. The second support 23 is coupled to the leading end of a drive shaft 27 of an adjustment fitting 26 fixed to the support base 24. In this manner, the disk rest 13 is held in an inclined state along the line L. The inclination angle of the disk rest 13 can be changed by moving the drive shaft 27 of the adjustment fitting 26.

Figure 5:
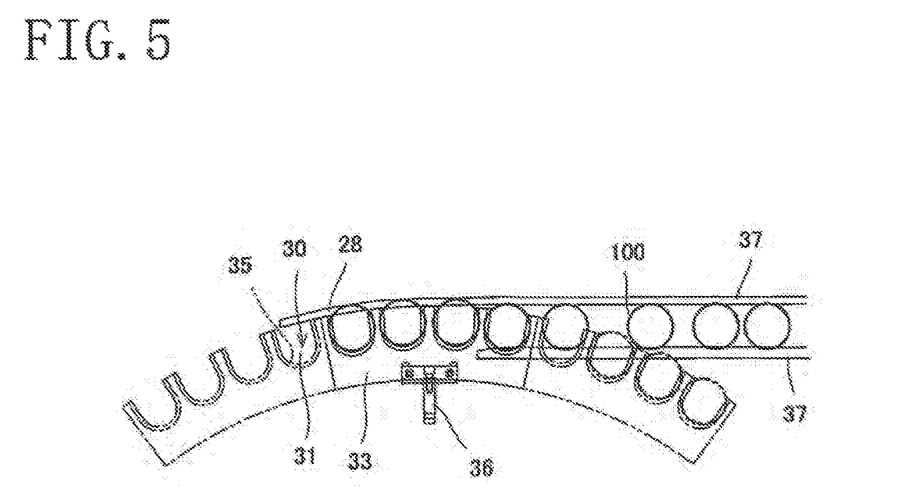
FIG. 5 is a plan view, on a partly enlarged scale, of the preform alignment apparatus according to the embodiment of the present invention.
Figure 6:
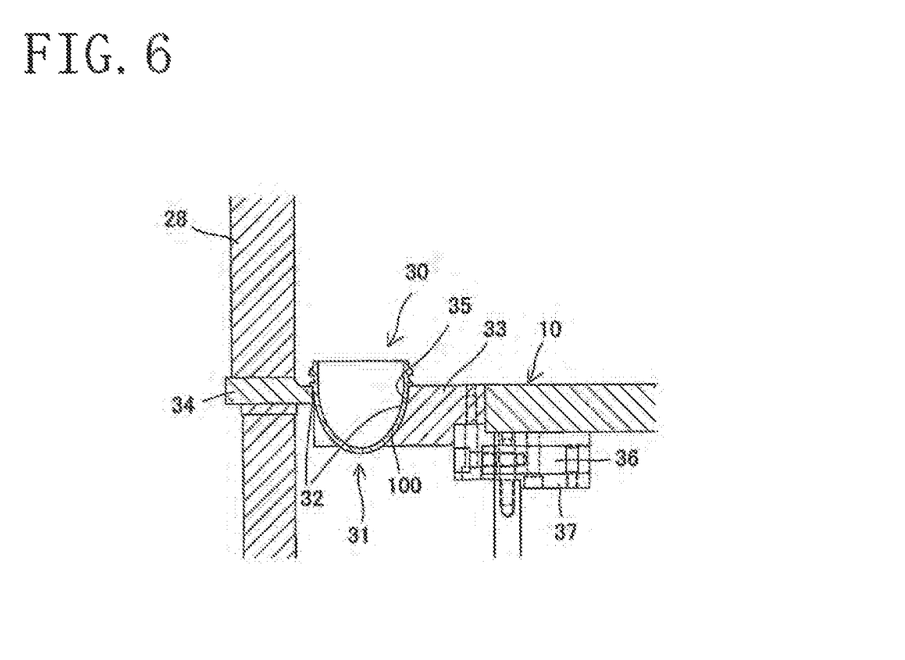
FIG. 6 is a partially sectional view of FIG. 3.

A plan view of essential parts of a pocket 30 is shown in FIG. 5. A cross section of the pocket broken away in a circumferential direction, and a cross section of the pocket broken away in a radial direction are shown in FIG. 6.

Around the disk 10 is provided a toroidal partition wall 28 erected on the outer wall 21 of the disk rest 13. At the peripheral edge of the disk 10, a plurality of the pockets 30 arranged side by side in the circumferential direction are provided. The pocket 30 includes an opening portion 31 into which the preform 100 is dropped, and a holding portion 32 for holding the preform 100 in an upright state is provided on the inner peripheral surface of the opening portion 31. The opening portion 31 has a shape in which the trunk 101 of the preform 100 is dropped, beginning with its bottom. The holding portion 32 is in a nearly tapered form gradually decreasing in diameter downward, and is shaped to support an upper part of the trunk 101 of the preform 100. Concretely, the holding portion 32 is shaped to imitate the shape of the upper part of the trunk 102 of the preform 100 as a site to be supported, and has a guide function facilitating the support of the preform 100 in a normal posture. This can allow the holding of the preform 100 having the trunk 101 of a somewhat different shape.

The preform 100 as mentioned above is held stably in an upright state, with the upper part (including the support ring 103) of the trunk 101 being supported. Moreover, a support member for supporting the trunk 101 from below may be provided.

The pocket 30 is formed by a pocket forming member 33 provided in the outer periphery of the disk 10, and a support member 34 provided on the partition wall 28. Concretely, in the present embodiment, four concavities 35 are formed in the pocket forming member 33, and open parts of the concavities 35 are closed with the partition wall 28 to form the pocket 30. An inner edge part of the concavity 35 has a nearly tapered surface whose lower site is more protuberant toward the preform 100, thereby constituting the holding portion 32. The pocket forming member 33 can be attached to and detached from a fastened means, which is provided below the outer periphery of the disk 10, and formed by a single fastening member 36. If the preform 100 complying with different standards is used, it suffices to change the pocket forming member 33. The pocket forming member 33 may be one having two or more of the concavities 35, or may be one having only the single concavity 35.

The supply region 2a of the preform alignment section 2 is supplied with the preforms 100 from the preform supply device 200. The preform supply device 200 comprises a receiving hopper 201 for accepting the preforms 100, an ascent conveyor 202 for transferring the preforms 100 within the receiving hopper 201 upward, a constant volume conveyor 203 for supplying the preforms 100 in a constant volume to the supply region 2a.

The preforms 100 supplied to the supply region 2a of the preform alignment section 2 are transported upwardly in the inclination direction (left side in FIG. 1, the side upstream in the rotation direction of the disk 10) in accordance with the rotational driving of the disk 10, and held in the pockets 30. In order to prevent many of the preforms 100 from being transported upwardly in the inclination direction (left side in FIG. 1) at a time, a bar 29 is extended above and across the partition wall 28, and is provided so that a sheet member (not shown) is hung down from the bar 29. The sheet member provided on the bar 29 is designed to collapse a pile of the preforms 100 and prevent a large volume of the preforms from being transported upwardly in the inclination direction (left side in FIG. 1). The aforementioned second disk 11 moves the preforms 100, accumulated in the center, in the direction of the supply region 2a. The second disk 11 need not always rotate, but may be rotationally driven if necessary. The second disk 11 need not necessarily be provided.

On the other hand, the preform discharge section 3 is coupled to the discharge region 2b of the preform alignment section 2. The preform discharge section 3 is equipped with discharge rails 37 for discharging the preforms 100 in an upright state from the pockets 30, semi-arcuate reversal rails 38 (shown in FIG. 2) coupled to the discharge rails 37, and a discharge belt conveyor 39 coupled to the reversal rails 38. The preforms 100 held in an upright state by the pockets 30 are passed on to the discharge rails 37 of the preform discharge section 3, held there, and then held in an inverted state by the reversal rails 38. Such preforms are transported in the inverted state by the discharge belt conveyor 39, and supplied to the blow molding machine (not shown).

At least one, preferably two or more, gas jetting units 40 are provided between the supply region 2a and the discharge region 2b. Between the gas jetting unit 40 and the discharge region 2b, a rotating blade unit 50 and a final gas jetting unit 60 are further provided.

Figure 7A:
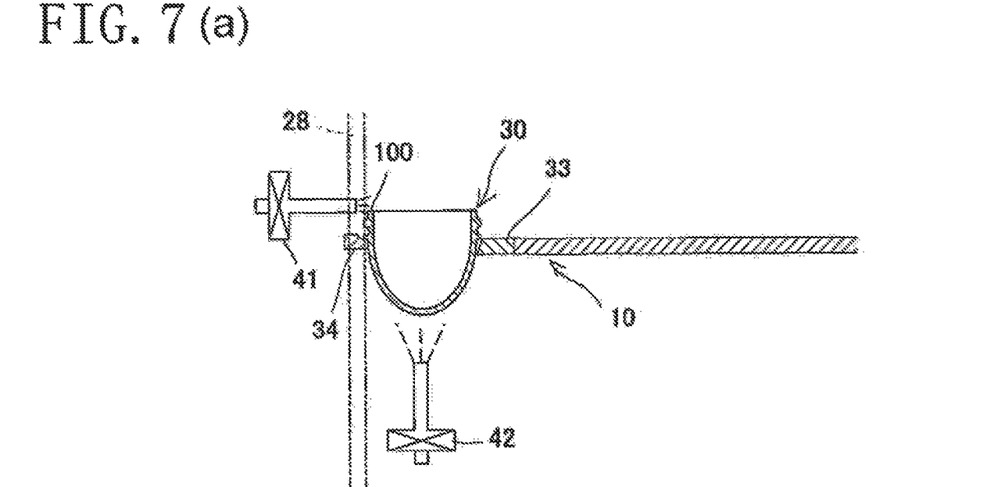
Figure 7B:
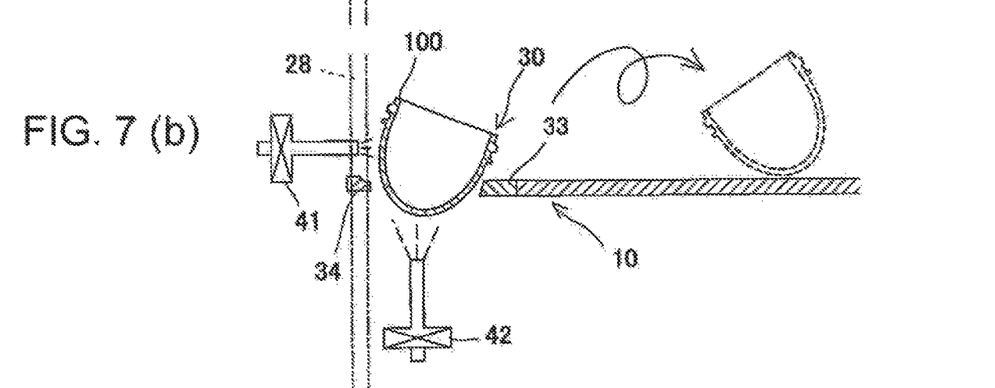
Figure 7C:
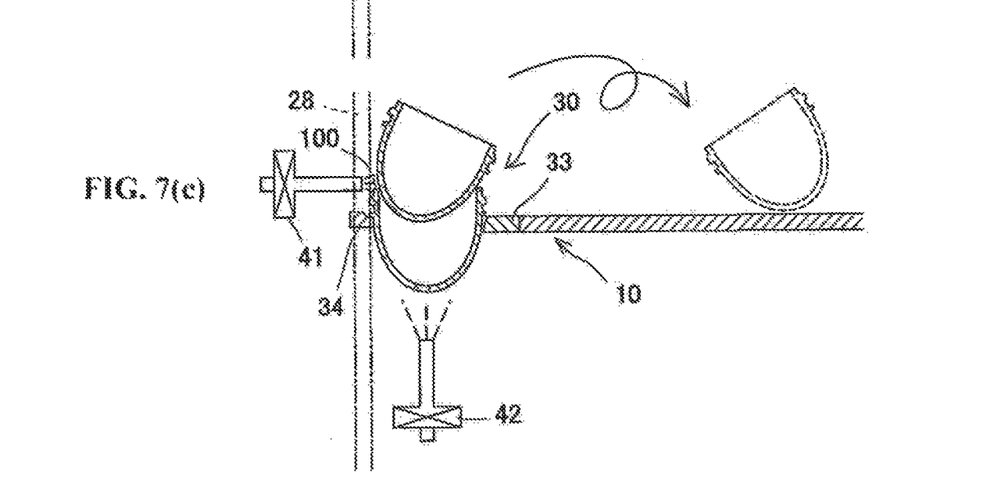

The schematic configuration of the gas jetting unit 40 is shown in FIGS. 7(a) to 7(c). As shown in FIGS. 7(a) to 7(c), the gas jetting unit 40 comprises a first jet nozzle 41 for jetting air from a lateral direction at the preform 100 held in the pocket 30, and a second jet nozzle 42 for jetting air at the preform from a lower direction. In the present embodiment, a jet stream of air is ejected from each of the first jet nozzle 41 and the second jet nozzle 42 constantly or intermittently at a timing when the pocket 30 passes.

With such a gas jetting unit 40, the jet stream is divided around the trunk 101 of the preform 100 held in a normal posture while being erected in the pocket 30, without exerting any action on this preform 100, as shown in FIG. 7(a). If the preform 100 is placed on the pocket 30 in an abnormal posture, rather than in a normal posture, on the other hand, the preform 100 is thrown out from the site on the pocket 30 by the jet stream ejected from the first jet nozzle 41 and the second jet nozzle 42, as shown in FIG. 7(b). By providing the second jet nozzle 42 working from the lower direction, as well as the first jet nozzle 41 acting from the lateral direction, the preform 100 placed on the pocket 30 in the abnormal posture can be reliably blown off by jets.

As noted above, the preform 100 placed on the pocket 30, not in the normal posture, but in the abnormal posture, is blown off by jets, and can be returned onto the disk 10. Thus, only the preforms 100 held in the normal posture by the pockets 30 are conveyed to the preform discharge section 3. The gas jetting unit 40 is effective even for the preform 100 loosely superposed on the preform 100 placed in the normal posture, and the loosely overlaid preform 100 can be thrown out and removed, as shown in FIG. 7(c).

In the present embodiment, a jet stream of air is always ejected from the first jet nozzle 41 and the second jet nozzle 42. However, it is permissible to provide a sensor configured to drive the jet nozzles intermittently at a timing when the pocket 30 passes; and, only when the sensor detects the appearance of the preform 100 placed on the pocket 30 in an abnormal posture, to drive the first jet nozzle 41 and the second jet nozzle 42.

In the present invention, for the purpose of transporting only the preforms 100, held in a normal posture in the pocket 30, to the preform discharge section 3 more reliably, the gas jetting units 40 are provided at two locations, but the gas jetting unit 40 may be provided at one location only.

Figure 8A:
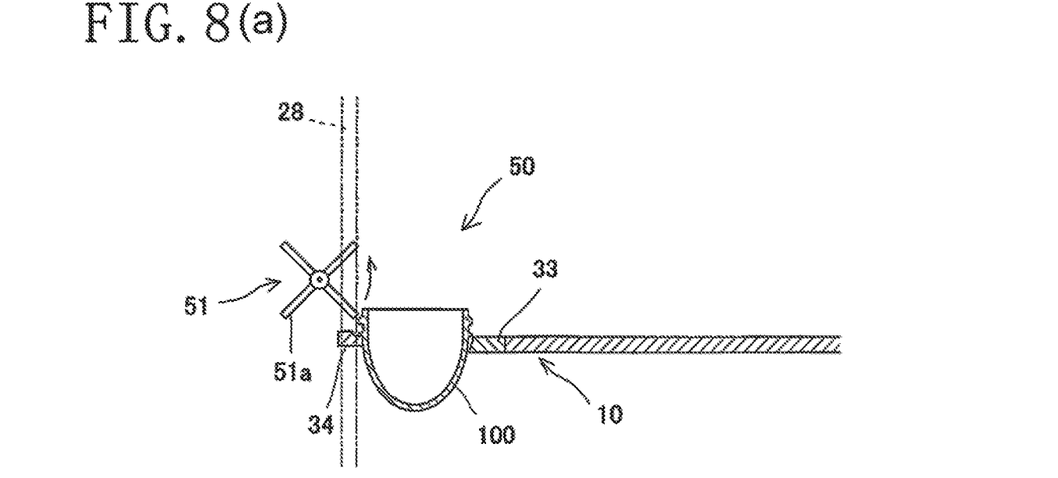
FIGS. 8(a) to 8(c) are views schematically showing the configuration of a rotating blade unit according to the embodiment of the present invention.
Figure 8B:
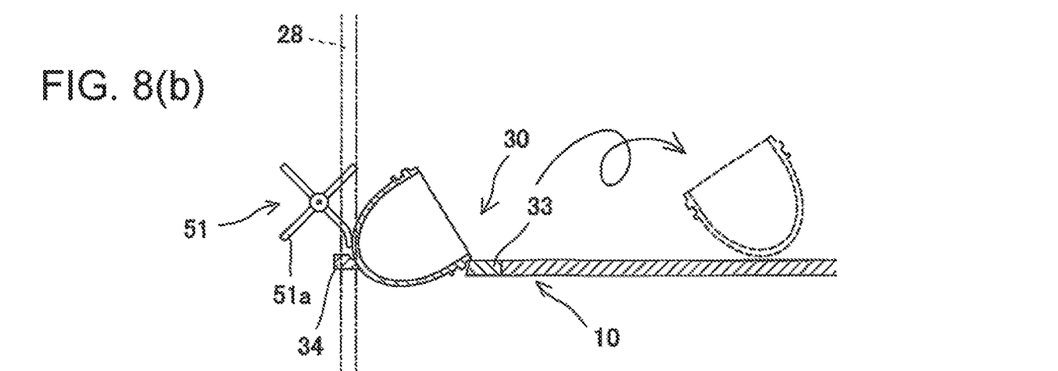
Figure 8C:
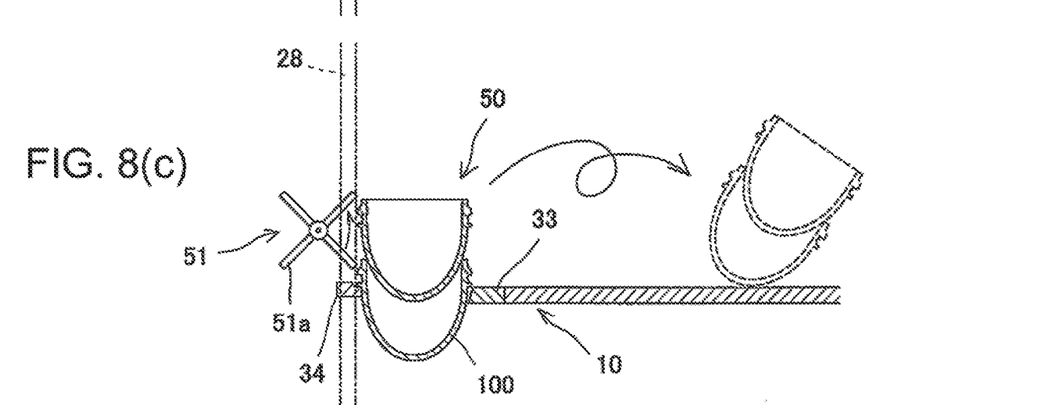

FIGS. 8(a) to 8(c) show the schematic configuration of the rotating blade unit 50. As shown in FIGS. 8(a) to 8(c), the rotating blade unit 50 includes a rotating blade 51 which is a rotating member to be rotationally driven. The rotating blade 51 is formed of an elastomer or rubber such as polyurethane and, in the present embodiment, includes four blades 51a. The blade 51a may be one which does not affect the preform 100 held in a normal posture by the pocket 30, but which pushes up only the preform 100 placed on the pocket 30 in an abnormal posture, not in a normal posture, to exclude it from the pocket 30. The blade 51a may have a length out of contact with the preform 100 held in the normal posture by the pocket 30. Alternatively, the blade 51a may be designed to have a length and hardness with which it contacts the preform 100 held in the normal posture by the pocket 30, but does not push up this preform 100. According to these features, the preform 100 held in the normal posture by the pocket 30 passes unchanged, as shown in FIG. 8(a). The preform 100 placed in an abnormal posture, rather than in the normal posture, on the pocket 30 is pushed up by the rotating blade 51, and returned onto the disk 10, as shown in FIG. 8(b). Thus, only the preforms 100 held in the normal posture by the pockets 30 are transported to the preform discharge section 3 more reliably. The rotating blade unit 50 is effective even for the preforms 100 stacked tightly in a double layer, and can exclude such doubly stacked preforms 100, as shown in FIG. 8(c).

In the present embodiment, the rotating blade 51 is configured to be always driven rotationally. However, a sensor may be provided and, only when the preform 100 placed on the pocket 30 not in a normal posture, but in an abnormal posture, is detected, the rotating blade 51 may be rotationally driven.

Figure 9A:
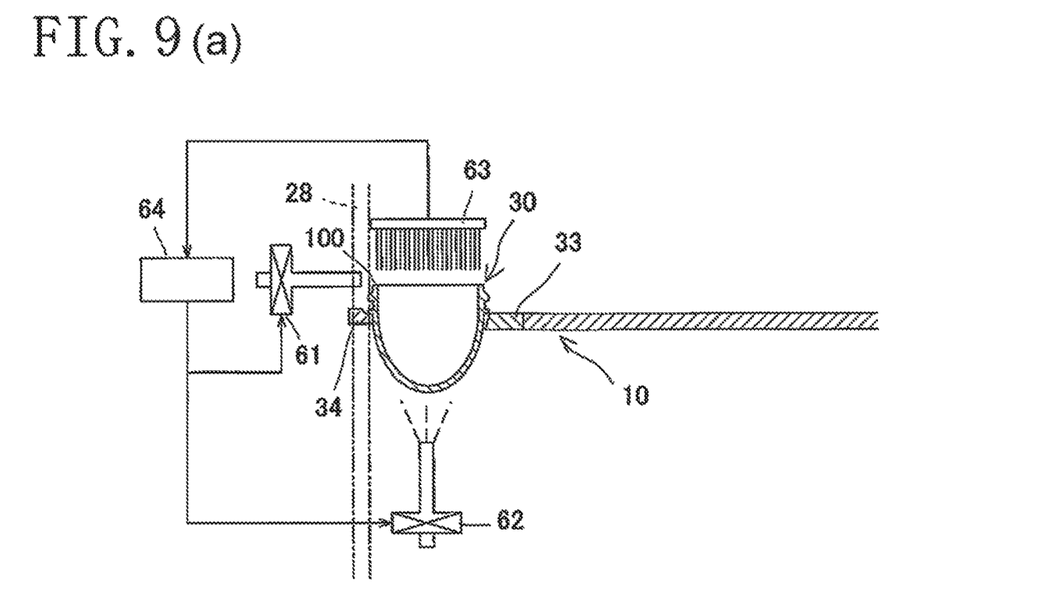
FIGS. 9(a), 9(b) are views schematically showing the configuration of a final gas jetting unit according to the embodiment of the present invention.
Figure 9B:
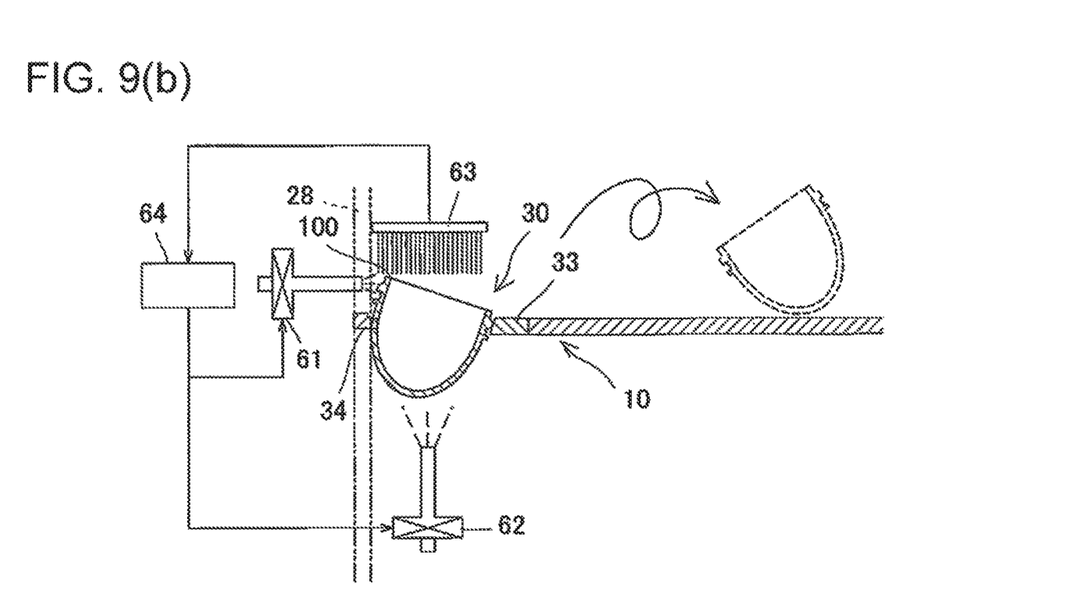

The schematic configuration of the final gas jetting unit 60 is shown in FIGS. 9(a), 9(b). As shown in FIGS. 9(a), 9(b), the final gas jetting unit 60 has the same basic configuration as that of the gas jetting unit 40, and comprises a first jet nozzle 61 for jetting air sideways at the preform 100 held in the pocket 30, and a second jet nozzle 62 for jetting air at the preform from below. The final gas jetting unit 60 further includes a sensor 63 for detecting whether or not the preform 100 is held in the pocket 30 in a normal posture, and a controller 64 for driving the first jet nozzle 61 and the second jet nozzle 62 based on the detection results of the sensor 63. The sensor 63 is a contact sensor intended for detecting the preform 100 placed on the pocket 30 not in a normal posture, but in an abnormal posture.

With such a final gas jetting unit 60, when the preform 100 is held in a normal posture in which it is erected in the pocket 30, as shown in FIG. 9(a), or if the preform 100 is not present, the sensor 63 falls into a non-detection state, and the controller 64 drives neither the first jet nozzle 61 nor the second jet nozzle 62. If the preform 100 is held not in a normal posture, but in an abnormal posture, on the pocket 30, as shown in FIG. 9(b), the sensor 63 enters a detection state, and the controller 64 drives the first jet nozzle 61 and the second jet nozzle 62, whereby jets being compressed air are ejected from the first jet nozzle 61 and the second jet nozzle 62. By providing the second jet nozzles 62 working from the lower direction, as well as the first jet nozzle 61 acting from the lateral direction, the preform 100 placed on the pocket 30 in the abnormal posture, rather than in the normal posture, can be reliably blown off by jets.

Anyway, in the present embodiment, the gas jetting unit 40, the final gas jetting unit 60, and the rotating blade unit 50, which are different in the manner of action, are provided, whereby only the preforms 100 held in the normal posture on the pocket 30 are transported to the preform discharge section 3 more reliably. The arrangement of the gas jetting unit 40, the rotating blade unit 50, and the final gas jetting unit 60 is not limited to that described above, but these units may be provided in any sequence.

In the above-described preform alignment apparatus 1, when the disk 10 is rotationally driven clockwise as in FIG. 1, the preforms 100 supplied to the supply region 2a are conveyed along the partition wall 28 in the obliquely upward direction of the disk 10, dropped into the pockets 30, and held there. On this occasion, the preforms 100 are sometimes placed on the pockets 30 in an abnormal state, except for those held in the pockets 30 in a normal posture. Such preforms 100 move together with the pockets 30, and pass the two gas jetting units 40, the rotating blade unit 50, and the final gas jetting unit 60. During this course, the preforms 100 placed on the pockets 30 not in a normal posture, but in an abnormal posture, are removed from the sites on the pockets 30, as mentioned above. Only the preforms 100 held in a normal upright state are moved to the preform discharge section 3, transferred to the discharge rails 37, reversed by the reversal rails 38, and transported in an inverted state to the blow molding machine (not shown) by the discharge belt conveyor 39.

The preform alignment apparatus 1 is provided with a full-state sensor (not shown) upwardly in the direction of inclination for detecting that the preforms 100 have been loaded to the full in the preform alignment section 2, and thus can take a measure such as stopping the supply of the preforms 100 from the preform supply device 200. The discharge belt conveyor 39 of the preform discharge section 3 is provided with a buffer region where the preforms 100 supplied in an excess volume are accumulated. Furthermore, the discharge belt conveyor 39 is also provided with a full-state sensor for detecting that the buffer region has become full of the preforms. Upon detection of the full state by such a sensor, a measure such as stopping the operation of the preform alignment apparatus 1 is taken.

EXPLANATION OF LETTERS OR NUMERALS

1 Preform alignment apparatus
2 Preform alignment section
2a Supply region
3 Preform discharge section
10 Disk
11 Second disk
28 Partition wall
30 Pocket
31 Opening portion
32 Holding portion
33 Pocket forming member
40 Gas jetting unit
41 First jet nozzle
42 Second jet nozzle
50 Rotating blade unit
51 Rotating blade
60 Final gas jetting unit
61 First jet nozzle
62 Second jet nozzle
63 Sensor
64 Controller
100 Preform

The invention claimed is:

1. A rotating disk-type preform alignment apparatus including a disk, which is rotationally driven about a rotation axis tilted from a vertical direction, and a partition wall erected outwardly of the disk, the apparatus being adapted to align preforms, which have been supplied onto the disk, at a peripheral edge of the disk and discharge the aligned preforms from a discharge section, the apparatus comprising:

pockets arranged side by side in a circumferential direction at the peripheral edge of the disk, each pocket having an opening portion into which the preform is dropped, and each pocket having a holding portion provided on an inner peripheral surface of the opening portion for holding the preform in an upright state; and a gas jetting unit, provided outwardly of the disk between a region where the preforms are supplied onto the disk and the discharge section, for jetting a gas from outside the pocket and from below the pocket, wherein the inner peripheral surface of the opening portion of the pocket has a tapered shape imitating a trunk shape of the preform; and the pockets are each formed by an attaching/detaching member mounted detachably on an outer periphery of the disk, and the partition wall.

2. The preform alignment apparatus according to claim 1, wherein the gas jetting unit includes a sensor for detecting the preform stuck in the pocket without being in a predetermined state, and the gas is jetted upon detection by the sensor.

3. The preform alignment apparatus according to claim 1, wherein the disk includes in a center thereof a second disk which is concentric with the disk and which is driven in an opposite direction.

4. The preform alignment apparatus according to claim 2, wherein the disk includes in a center thereof a second disk which is concentric with the disk and which is driven in an opposite direction.

5. The preform alignment apparatus according to claim 2, wherein the pockets are each formed by an attaching/detaching member mounted detachably on an outer periphery of the disk, and the partition wall.

6. The preform alignment apparatus according to claim 3, wherein the pockets are each formed by an attaching/detaching member mounted detachably on an outer periphery of the disk, and the partition wall.

7. The preform alignment apparatus according to claim 4, wherein the pockets are each formed by an attaching/detaching member mounted detachably on an outer periphery of the disk, and the partition wall.

8. The preform alignment apparatus according to claim 1, further comprising a supply device for supplying the preforms in a constant volume onto the disk.

9. The preform alignment apparatus according to claim 2, further comprising a supply device for supplying the preforms in a constant volume onto the disk.

10. The preform alignment apparatus according to claim 3, further comprising a supply device for supplying the preforms in a constant volume onto the disk.

11. The preform alignment apparatus according to claim 4, further comprising a supply device for supplying the preforms in a constant volume onto the disk.

12. The preform alignment apparatus according to claim 1, further comprising a rotating member provided above the disk between the region where the preforms are supplied onto the disk and the discharge section, wherein the rotating member rotates below in a vertical direction from outside toward inside to rake out the preform stuck in the pocket without being in a predetermined state.

13. The preform alignment apparatus according to claim 9, further comprising a supply device for supplying the preforms in a constant volume onto the disk.

14. The preform alignment apparatus according to claim 11, further comprising a supply device for supplying the preforms in a constant volume onto the disk.

15. The preform alignment apparatus according to claim 12, further comprising a supply device for supplying the preforms in a constant volume onto the disk.

16. The preform alignment apparatus according to claim 13, further comprising a supply device for supplying the preforms in a constant volume onto the disk.

* * * * *